United States Patent [19]

Georgopoulos

[11] 3,708,697

[45] Jan. 2, 1973

[54] PHASE SHIFTER DRIVER AMPLIFIER

[75] Inventor: Christos J. Georgopoulos, Lowell, Mass.

[73] Assignee: Raytheon Company, Lexington, Mass.

[22] Filed: Feb. 1, 1971

[21] Appl. No.: 111,395

[52] U.S. Cl. ..................307/270, 307/106, 307/268, 307/314, 343/854

[51] Int. Cl. ..............................................H03k 1/00

[58] Field of Search......307/106, 108, 268, 270, 314; 343/778, 854

[56] References Cited

UNITED STATES PATENTS

| | | | |
|---|---|---|---|
| 3,596,145 | 7/1971 | Sheldon | 343/854 X |
| 3,213,433 | 10/1965 | Tribby | 307/270 X |
| 3,446,984 | 5/1969 | Shukla | 307/270 X |
| 3,239,681 | 3/1966 | Bond | 307/270 X |
| 3,484,784 | 12/1969 | McLeod, Jr. | 343/854 X |
| 3,343,127 | 9/1967 | Ruff | 307/314 X |
| 2,951,186 | 8/1960 | Dickinson | 307/314 X |
| 3,383,524 | 5/1968 | Garrahan | 307/268 X |
| 3,276,019 | 9/1966 | Fackler | 343/854 X |

*Primary Examiner*—Donald D. Forrer
*Assistant Examiner*—R. C. Woodbridge
*Attorney*—Philip J. McFarland and Joseph D. Pannone

[57] ABSTRACT

A driver amplifier for p-i-n diode phase shifters in a matrix of phase shifters in an antenna array is disclosed. The output stage of the driver amplifier is arranged so that, during each period in which the p-i-n diodes in any one of the phase shifters are forward-biased, an inductor is charged. Thus, when it is desired to back-bias any one of the p-i-n diodes, the energy in the inductor may be discharged through the p-i-n diode to decrease the time required to switch such diode to its back-biased condition.

2 Claims, 1 Drawing Figure

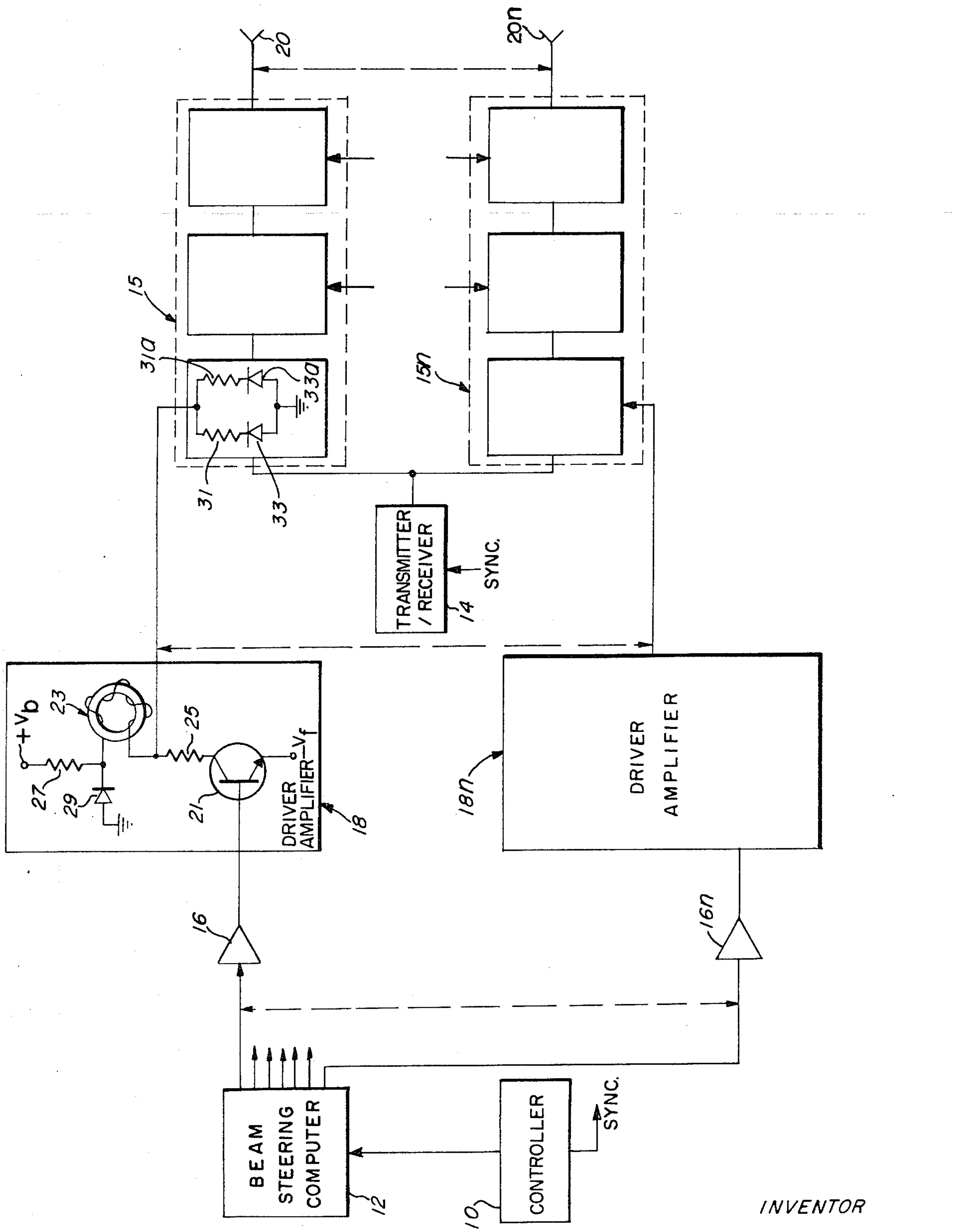
INVENTOR
CHRISTOS J. GEORGOPOULOS

PHASE SHIFTER DRIVER AMPLIFIER

BACKGROUND OF THE INVENTION

This invention pertains generally to microwave antennas and particularly to phased array antennas using diode phase shifters.

It is known in the art that semiconductor diodes may be used as switching devices in some types of digital phase shifters in phased array antennas. So-called "p-i-n" diodes are the commonly used semiconductor diodes for such a purpose when it is desired to phase-shift relatively large amounts of microwave energy.

The characteristics of known types of p-i-n diodes are such that, especially in applications in which the switching time must be kept to a minimum, relatively high power signals are required to cause such diodes to operate as switching devices. That is, in order to change any known type of p-i-n diode from its conductive (meaning forward-biased) to its nonconductive (meaning back, or reverse, biased) condition, or vice-versa, it is necessary to provide relatively costly control circuitry. Specifically, it is necessary that known p-i-n diode driver circuits incorporate high power output stages. Such stages are usually implemented by using at least two high power transistors, one to operate to change the associated p-i-n diodes from their conducting to non-conducting states and the other to operate to change the associated p-i-n diodes from their nonconducting to conducting states.

While there are many known p-i-n driver circuits which are adequate for the purpose, there are no known circuits of such type which are "fail-safe." That is, in all known p-i-n driver circuits failure of a p-i-n diode, as by short-circuiting, may in turn cause catastrophic failure of the associated p-i-n diode drive circuit. For this reason, it is common practice to fuse the output line of p-i-n diode drive circuits. Obviously, although such a conventional safety measure is usually efficacious, it sometimes is ineffective or, perhaps worse, disables the p-i-n diodes and the p-i-n diode driver circuits in response to transient signals.

When the number of p-i-n diode phase shifters and p-i-n diode drivers in many known phased array antennas is considered, it becomes readily apparent that any savings in cost and improvement in reliability will be significant. For example, it is quite common to use 20,000 or more p-i-n diode phase shifters (each having four bits), making it necessary to provide 80,000 p-i-n diode driver circuits for an array in a phased array antenna.

SUMMARY OF THE INVENTION

Therefore, it is a primary object of this invention to provide improved digital phase shifter circuitry for phased array antennas.

Another object of this invention is to provide a high power digital phase shifter driver circuit which requires fewer power transistors to switch p-i-n diodes. Still another object of this invention is to provide an improved phase shifter driver circuit for p-i-n diodes, such circuit having a higher degree of reliability than known driver circuits for such purpose.

A still further object of this invention is to provide an improved driver circuit for p-i-n diodes using known components, such circuit being less costly than known driver circuits.

These and other objects of this invention are attained generally by providing an improved driver circuit for each group of p-i-n diodes associated with each bit in each digital phase shifter of the semiconductor-diode type in a phased array antenna, such driver circuit including an output stage that includes a power transistor for biasing p-i-n diodes in one direction, say forward, and an inductor for biasing such diodes in the opposite direction, the power transistor being controlled by command signals from a beam steering computer.

BRIEF DESCRIPTION OF THE DRAWING

For a more complete understanding of the invention, reference is now made to the accompanying description of a preferred embodiment of this invention as illustrated in the accompanying drawing, the single FIGURE of which is a simplified sketch showing the contemplated phase shifter driver circuit in its relative position in a radar incorporating a phased array antenna having p-i-n diode phase shifters, the sketch showing the output stage of an exemplary p-i-n driver circuit.

Before referring to the figure, it should be noted that all conventional elements which are not essential to an understanding of the invention itself are in simple block form, it being deemed obvious to a man of skill in the art that the details of such elements may take any form desired for a particular radar. In this connection, it should be noted that a three bit digital phase shifter has been selected as the illustrative phase shifter and that only an exemplary p-i-n diode switching arrangement in a single bit of a single phase shifter has been shown.

DESCRIPTION OF THE PREFERRED EMBODIMENT

Referring now to the figure, it may be seen that, except for the output stage of the p-i-n diode driver circuit, the arrangement of a radar using the invention is conventional. Thus, a controller 10 provides, in any known way, appropriate signals to a beam steering computer 12 and a transmitter/receiver 14, thereby to derive any desired beam steering commands and to synchronize operation of the various elements of the system. The beam steering command signal for each bit in each digital phase shifter 15 . . . **15*n* is here shown connected through a preamplifier 16 . . . 16*n* and a driver circuit 18 . . . 18*n* to the diode switches (not numbered) in each bit of each one of the digital phase shifters 15 . . . 15*n*. Obviously, however, the digital phase shifters 15 . . . 15*n* could have been connected in the well-known "row" and "column" configuration to decrease the number of beam command signal lines. To complete the disclosed arrangement, each one of the digital phase shifters 15 . . . 15*n* is connected, as shown, between an antenna element 20 . . . 20*n* and the transmitter/receiver 14** to provide a path for microwave energy.

Turning back to the driver circuit 18 and its associated diode switches in, say, digital phase shifter 15, it may be seen that the former here includes a transistor 21 and an inductor 23 arranged so as to provide forward and reverse bias current to the p-i-n diodes in their associated bit digital phase shifters 15. Thus, the emitter electrode (not numbered) of the transistor 21 is connected to a first power source, $-V_f$, the collector electrode (not numbered) of such transistor is connected, through a resistor 25, the coil winding (not numbered) of the inductor 23 and a resistor 27, to a second power source, $+V_b$. The base electrode (not numbered) of the transistor 21 is connected to the output terminal of the preamplifier 16. To complete the driver circuit 18, the junction of the coil winding of the inductor 23 is connected, through a diode 29, to ground. The output of the driver circuit 18 is taken from the junction of resistor 25 and the coil winding of the inductor 23, here being connected, as shown, through a pair of resistors 31, 31a and a pair of p-i-n diodes 33, 33*a* to ground. It is noted here that the first and the second power source ($-V_f$ and $+V_b$) are also grounded in a conventional manner and that the various DC grounds are the same.

With a logic "zero," i.e., approximately zero volts, as the input signal to the preamplifier 16, transistor 21 is in its nonconductive state. Under such a condition, the p-i-n diodes 33, 33*a* are back-biased by reason of leakage current from the second power source, $+V_b$, through resistor 27 and the inductor 23 and resistors 31 and 31*a*. Conversely, with a logic "one," i.e., say approximately 2 volts, input signal to the preamplifier 16, transistor 21 may be caused to conduct. In the steady state (with transistor 21 conducting) the p-i-n diodes in digital phase shifter 15 are forward-biased by reason of current flowing through transistor 21 from the first power source, $-V_f$.

When a change from a logic "one" to a logic "zero" signal at the preamplifier 16 occurs, transistor 21 is cut off. Because, however, the current through the inductor 23 cannot change instantaneously, it must, perforce, surge through the diode 29, resistors 31, 31*a* and p-i-n diodes of the digital phase shifter 15. Such a surge of current then rapidly depletes the i-layer of the p-i-n diodes 33, 33*a*, thereby decreasing the time required to back-bias such elements.

When a change from a logic "zero" to a logic "one" occurs at the input of the preamplifier 16, the current through the inductor 23 tends to increase. Because, however, the current flowing through the inductor 23 cannot change instantaneously, the voltage at the output of the driver amplifier 18 initially is such as to impress a large forward-bias voltage on the p-i-n diodes 33, 33*a*. Such a voltage, of course, decreases the time required to forward-bias the p-i-n diodes 33, 33*a*.

It is a simple matter to design an inductor for use in the just-described circuit because it is necessary only that the energy stored in the inductor when the p-i-n diodes are forward-biased be equal to, or greater than, the energy stored in the p-i-n diodes when they are similarly biased. In any particular application, the storage charge of each p-i-n diode, the number of such diodes and the initial voltage across each p-i-n (conveniently taken to be approximately equal to the forward-bias voltage, $-V_f$) may be combined in a conventional manner to determine the minimum amount of energy to be stored in the inductor. Considerations of size, shape and available power sources then determine the details of the inductor. It is noted, however, that a toroidal core is to be preferred for the inductor because such a shape almost always reduces the overall size of the inductor and minimizes flux leakage.

It will be noted here that the disclosed circuitry need not be fused to avoid danger of overload if any, or all, p-i-n diodes short circuit. That is, because the charging and discharging of the inductor in the illustrated circuit is, essentially, not dependent on the second power source, $+V_b$, the resistor 27 may be relatively large so as to prevent excessive current from being drained from that source.

Having described this invention and having noted at least some of the changes which may be made without departing from my inventive concepts, it is felt that this invention should not be restricted to its disclosed embodiment, but rather should be limited only by the spirit and scope of the appended claims.

What is claimed is:

1. For use in a phased array antenna for microwave energy, such antenna incorporating a matrix of antenna elements and semiconductor-diode phase shifters, a plurality of driver amplifiers selectively to actuate such phase shifters from a source of forward-bias voltage and a source of back-bias voltage, each one of such driver amplifiers comprising:

a. a forward-bias output stage including a transistor, such transistor being biased normally beyond cutoff, a first electrode thereof being connected to the source of forward-bias voltage;

b. a back-bias output stage including an inductor having a first and a second terminal;

c. output means connecting such first terminal and a second electrode of the transistor to one electrode of the semiconductor diodes in the one of the phase shifters to be actuated;

d. back-biasing circuit means connecting the second terminal of the inductor to the source of back-bias voltage, such circuit means including a current limiting resistor between such second terminal and such source and a semiconductor diode between such second terminal and the second electrode of the semiconductor diodes in the one of the phase shifters to be actuated, such semiconductor diode being poled to be conductive only during each period of time when the inductor is being discharged; and e. actuating means, responsive to a forward-biasing control signal applied to the third electrode of the transistor, for causing the transistor to conduct, thereby to apply a forward-bias voltage to the semiconductor diodes in the one of the phase shifters to be actuated and to charge the inductor.

2. For use with semiconductor-diode phase shifters incorporating p-i-n diodes, a plurality of driver amplifiers as in claim 1 wherein the inductor in each one thereof is a toroidal coil disposed on a magnetizable core, the inductance of such coil being such that the magnetic energy stored therein during the period of time in which the transistor is conducting is equal to, or greater than, the electrical energy stored in the p-i-n diodes during such period.

* * * * *